…

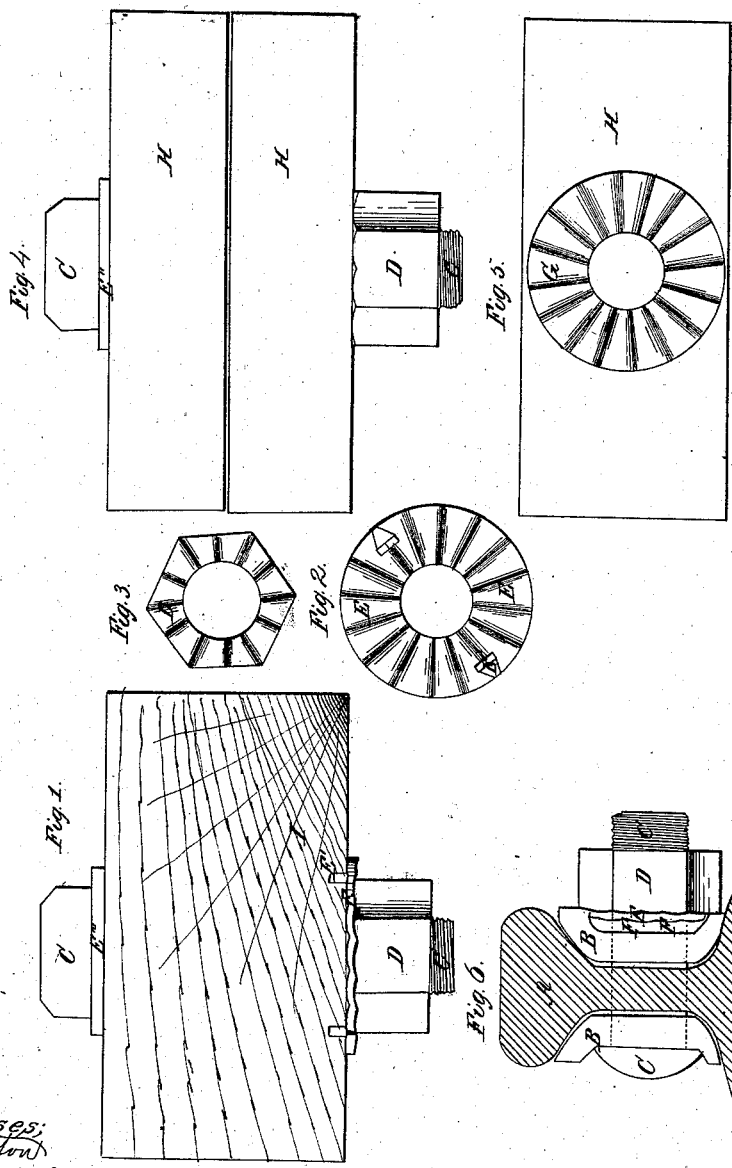
A. N. Towne,
Lock-Nut.
Nº 80,034. Patented July. 14. 1868.

United States Patent Office.

A. N. TOWNE, OF CHICAGO, ILLINOIS.

Letters Patent No. 80,034, dated July 14, 1868.

IMPROVEMENT IN LOCK-NUTS.

The Schedule referred to in these Letters Patent and making part of the same.

TO ALL WHOM IT MAY CONCERN:

Be it known that I, A. N. TOWNE, of the city of Chicago, in the county of Cook, and State of Illinois, have invented a new and useful Improvement in Corrugated Nuts and Washers, for the more perfect protection to the parts to which they may be applied; and I do hereby declare that the following is a full, clear, and exact description of the same, reference being had to the accompanying drawings, forming a part of this specification, in which—

Figure 1 is a front elevation of an application of my invention to a bolt and piece of timber.

Figure 2 is a top or plan view of my washer, showing corrugations, with lugs turned up to hold the same in the timber, as shown in fig. 1.

Figure 3 is a plan view of the corrugated nut.

Figure 4 is a front elevation of the application of my invention to the bolting together of two bars or plates of iron.

Figure 5 is a plan or top view of a plate of iron having the corrugation stamped or impressed thereon.

Figure 6 is an end view of a section of a T-rail with the application of my invention to the "fish-joint" for connecting rails, sometimes called a splice-joint.

Similar letters of reference in the several figures indicate corresponding parts in the several applications indicated of my invention.

The nature of my invention consists in corrugating a nut and washer, for the purpose of preventing the nut from being loosened or turned off by the jars and concussions of cars, rolling-stock of railroads, other vehicles, conveyances, or wherever the same may be used, either by the shrinkage of timber, or other means, by which nuts are or may be loosened or lost.

In order to accomplish this end, I corrugate the nut and washer, and in case there is no elasticity of the parts, I intervene an elastic washer, rubber, or leather, or any other suitable material, for the purpose of allowing the corrugations to pass each other until the parts are firmly united.

Heretofore jam-nuts have been used for this purpose, and are still used, but they only partially succeed in the object desired—the security and unity of the parts, and retaining the nuts in their places without loosening or shattering. Besides, double nuts or jam-nuts are bunglesome, lack finish, and neatness of construction, and take time to apply them. Experience, too, has shown them to be unsafe, and inadequate for the protection of the parts; and in railroading, serious disasters have followed their becoming loosened, shattering off, and the bolts lost. Hence the importance and practical value of a means by which it is made impossible for the nut to yield, loosen, turn back, and shatter off when it is firmly screwed up to its place, which, of course, should be its maximum fit.

It will be readily understood, that, in two parts of iron being brought together without the intervention of wood or some other elastic material, an elastic washer must be used at the head of the bolt, or somewhere intervening, to afford the required elasticity to the parts, to allow the projections or corrugations on the iron plate or bar and nut to pass each other. But when wood is used in connection with the part or parts to be bolted or fastened together, the natural elasticity will be found usually sufficient without the intervention of the elastic washer.

The application of this invention to the "fish-joint," as shown at fig. 0 of the drawings, is of peculiar and great importance to protect the rail from separating, and thus cause disaster to trains passing over it.

A, fig. 6, shows the rail; B B, the grooved or recessed plates of the fish-joint on each side of the rail, and lengthwise, extending far enough beyond the end of each rail to take two bolts, one of which is shown in the drawings.

C C represent the bolt passing through the two plates, the rail, elastic washer, corrugated washer, and corrugated nut.

D, corrugated nut.

E is the corrugated washer.

F F is the elastic washer.

In this figure the rails are brought together end and end, the recessed plates are put in place, the bolts passed through, the elastic washer put on the bolt next to the plate B, and on the nut-side; the corrugated washer is then put on; then the corrugated nut is put on and firmly screwed up to its place to a perfect maximum fit. It will be seen that the rubber firmly holds the corrugated washer to its place, and by which means the nut is firmly held to its place, and no changes of temperature in the atmosphere, no expansion or contraction, and no jar or concussion can possibly loosen or remove it.

Fig. 1. C C is the bolt, passing through a timber, with corrugated washer, E, showing lugs in the timber, I, to prevent the washer from turning when the nut is screwed up. These lugs are represented by E', in the drawings.

E''' shows common iron washer under the head of the bolt.

The lugs E may or may not be used, as they are found necessary or useful.

E'' shows a leather or elastic washer, to give a slight elasticity where all the parts are metal, as shown in fig. 4.

To enable others skilled in the art to make or construct my invention, I will say that my nut and washer may be made by the use of a stamp or die, properly constructed for that purpose, with suitable corrugations; and the stamping may be done when the nut and washer are made, or subsequently, as may be desired, and this may be done upon either a hot or cold surface. The plate of iron, when no washer is used, may be stamped in the same manner, the dies being made in size and proportion, form and corrugation, to suit the application to be made.

I have thus endeavored to set forth some of the various modes in which this invention may be used practically and successfully, but there are many other uses to which it may be applied with great advantage and utility—splice-bar for track-rails of various forms of structure, bridges, trusses, &c., &c.

From the drawings and foregoing description my invention will be readily understood, as well as its various modes of application, without further details of the same.

Having thus described my invention, what I claim as new, and desire to secure by Letters Patent of the United States, is—

The corrugated nut D and washer E, constructed as described, when used in combination with an elastic packing or washer.

Witness my hand to my specification.

A. N. TOWNE.

Witnesses:
RICHD. J. MOORE,
W. F. WHITEHOUSE.